(12) United States Patent
Yamaguchi

(10) Patent No.: US 11,211,235 B2
(45) Date of Patent: Dec. 28, 2021

(54) IMAGING MASS SPECTROMETRY DATA PROCESSING DEVICE

(71) Applicant: SHIMADZU CORPORATION, Kyoto (JP)

(72) Inventor: Shinichi Yamaguchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/053,970

(22) PCT Filed: May 30, 2018

(86) PCT No.: PCT/JP2018/020835
§ 371 (c)(1),
(2) Date: Nov. 9, 2020

(87) PCT Pub. No.: WO2019/229899
PCT Pub. Date: Dec. 5, 2019

(65) Prior Publication Data
US 2021/0242004 A1  Aug. 5, 2021

(51) Int. Cl.
*H01J 49/00* (2006.01)
*H01J 49/16* (2006.01)
(Continued)

(52) U.S. Cl.
CPC .......... *H01J 49/0004* (2013.01); *G01N 30/72* (2013.01); *G01N 30/8624* (2013.01);
(Continued)

(58) Field of Classification Search
CPC ...... H01J 49/0004; H01J 49/164; H01J 49/40; H01J 49/0036; G01N 30/72;
(Continued)

(56) References Cited

U.S. PATENT DOCUMENTS

2018/0218892 A1  8/2018  Yamaguchi et al.
2019/0115200 A1  4/2019  Harda
(Continued)

FOREIGN PATENT DOCUMENTS

| JP | 2017-032465 A | 2/2017 |
| WO | 2016/103388 A1 | 6/2016 |
| WO | 2017/183086 A1 | 10/2017 |

OTHER PUBLICATIONS

"IMScope TRIO Imaging Mass Microscope", [online], [Searched on Mar. 16, 2018], Shimadzu Corporation, Internet, pp. 1-7.
(Continued)

*Primary Examiner* — Kiet T Nguyen
(74) *Attorney, Agent, or Firm* — Sughrue Mion, PLLC

(57) ABSTRACT

A peak-waveform conversion processor detects a peak in a profile spectrum created based on data obtained at each measurement point in a sample's measurement area, and acquires a rod-like peak by performing centroid conversion processing on a waveform of the peak having a mountain shape. When an operator specifies a target compound to be observed, a mass difference calculation unit calculates a mass difference between a precise m/z of the target compound and an m/z of a rod-like peak at a position close to the precise m/z for each measurement point. A mass difference image creator creates an image showing a distribution of mass differences based on the calculated mass differences. A mass difference related information calculation unit acquires an index value such as an average value of a plurality of mass differences for each mass difference image, and creates a graph showing a frequency distribution of the mass differences.

3 Claims, 4 Drawing Sheets

(51) Int. Cl.
  *H01J 49/40*   (2006.01)
  *G01N 30/86*   (2006.01)
  *G01N 30/72*   (2006.01)
(52) U.S. Cl.
  CPC ..... *G01N 30/8637* (2013.01); *G01N 30/8679* (2013.01); *H01J 49/0036* (2013.01); *H01J 49/164* (2013.01); *H01J 49/40* (2013.01)
(58) Field of Classification Search
  CPC ........... G01N 30/8624; G01N 30/8637; G01N 30/8679; G01N 27/62
  USPC ................................................. 250/281, 282
  See application file for complete search history.

(56) References Cited

U.S. PATENT DOCUMENTS

| | | | |
|---|---|---|---|
| 2019/0221409 A1* | 7/2019 | Takeshita | H01J 49/0004 |
| 2019/0272984 A1* | 9/2019 | Takeshita | H01J 49/164 |
| 2020/0110064 A1* | 4/2020 | Sugimoto | G01N 27/62 |
| 2021/0035790 A1* | 2/2021 | Nakakimura | H01J 49/0004 |
| 2021/0057200 A1* | 2/2021 | Ikegami | H01J 49/164 |

OTHER PUBLICATIONS

International Search Report for PCT/JP2018/020835 dated Jul. 24, 2018 {PCT/ISA/210}.
Written Opinion for PCT/JP2018/020835 dated Jul. 24, 2018 {PCT/ISA/237}.

* cited by examiner

MEASURED PEAK

PEAK AFTER CENTROID CONVERSION PROCESSING

WHEN m/z OF INDICATED COMPOUND IS CLOSE

DISTRIBUTION IMAGE OF Δm

WHEN m/z OF INDICATED COMPOUND IS APART

IMAGING MASS SPECTROMETRY DATA PROCESSING DEVICE

CROSS REFERENCE TO RELATED APPLICATIONS

This application is a National Stage of International Application No. PCT/JP2018/020835 filed May 30, 2018.

TECHNICAL FIELD

The present invention relates to an imaging mass spectrometry data processing device configured to process mass spectrometry data on each of many micro areas in a measurement area on a sample, collected using an imaging mass spectrometer, and configured to create and display, for example, an image showing a two-dimensional intensity distribution of a specific compound.

BACKGROUND ART

An imaging mass spectrometer is capable of measuring a two-dimensional intensity distribution of ions having a specific mass-to-charge ratio m/z on the same sample surface while observing morphology of a surface of a sample such as a biological tissue section with an optical microscope (refer to Patent Literature 1, Non-Patent Literature 1, etc.). Observing a mass spectrometry image showing a two-dimensional intensity distribution of a compound-derived ion characteristically appearing in a specific disease such as cancer using an imaging mass spectrometer enables grasping progression of the disease and effect of treatment by medication or the like. For these reasons, in recent years, pharmacokinetic analysis of biological tissue sections and research for analyzing differences in compound distribution in each organ or in compound distribution between pathological sites, such as cancer, and normal sites, have been actively conducted using imaging mass spectrometers.

Although such an imaging mass spectrometer allows mass spectrometry to be performed over a predetermined mass-to-charge ratio range for each of many micro areas (measuring points) that are set in a measurement area on a sample or that are acquired by finely dividing the measurement area, data obtained in one micro area are profile data showing a continuous waveform in a mass-to-charge ratio direction. The imaging mass spectrometer includes a data processor, specifically, a computer for data processing in which profile data for each micro area collected by measurement is stored in a memory device and a mass spectrometry image is created through data processing on this data.

A conventional typical imaging mass spectrometry data processing device (hereinafter, simply referred to as a "data processing device") creates a mass spectrometry image using, for example, the following procedure and data processing.

When a user wants to observe a two-dimensional distribution image of a compound in a sample, the user instructs execution of image creation processing after specifying a mass-to-charge ratio value M of the compound and an allowable range of the mass-to-charge ratio (hereinafter, simply referred to as an "allowable range") $\Delta M$. When the user specifies a compound name instead of specifying the mass-to-charge ratio value of the compound, the mass-to-charge ratio value corresponding to the compound name may be derived from a compound database. The allowable range is usually determined based on mass accuracy of the imaging mass spectrometer. An imaging mass spectrometer typically uses a mass spectrometer having high mass accuracy such as a time-of-flight mass spectrometer, and thus usually has a considerably small allowable range.

The data processing device instructed to start image creation searches for a range (a bin range, or hereinafter referred to as an "intensity integration range") for integrating peak intensities for obtaining a peak intensity in which intensity data of a peak are integrated from profile data on each micro area stored in the memory device, where the "intensity integration range" includes a mass-to-charge ratio range (hereinafter referred to as a "precision mass range") acquired according to "$M \pm \Delta M$", where M is a specified mass-to-charge ratio value and $\Delta M$ is an allowable range for each micro area. FIGS. 4 and 5 are each a profile spectrum showing a relationship between the precision mass range and the intensity integration range.

In FIGS. 4 and 5, the center mass-to-charge ratio value of the peak formed using the profile data obtained by the measurement is Mm. This peak is ideally to be observed as a single vertical bar at the position of the mass-to-charge ratio value Mm with no width. But actually, the peak has width due to error factors such as variations in repeated measurements in addition to limitation in the mass accuracy and resolution of the device itself. This peak width is generally wider than the accuracy range of the device at the center of the peak. The intensity integration range is set to substantially over the width of this peak, so that the integrated intensity value of almost the entire peak, i.e., a signal intensity value corresponding to the area value of the peak, is regarded as the signal intensity value at the mass-to-charge ratio value Mm which is the center of the peak.

In FIGS. 4 and 5, the shape of the peak waveform, both of which centers on the mass-to-charge ratio value Mm, is identical, and thus has the same signal intensity value at the mass-to-charge ratio value Mm which is the center of the peak. Further, the precision mass range is included in the intensity integration range in FIGS. 4 and 5, so that the signal intensity value at the mass-to-charge ratio value Mm is considered as signal intensity corresponding to the compound specified by the user. When such processing is performed in each micro area, the signal intensity value for each micro area is obtained, and the signal intensity values are mapped to create a mass spectrometry image corresponding to the compound specified by the user.

However, the data of FIGS. 4 and 5 are different from each other as follows. The peak waveform of FIG. 4 includes the mass-to-charge ratio value Mm which is the peak center in the precise mass range. That is, the difference between the mass-to-charge ratio value Mm which is the peak center and the precise mass-to-charge ratio value of a target compound is within a range of device accuracy, so that it can be inferred that the mass-to-charge ratio value Mm which is the peak center calculated as described above substantially indicates the signal intensity value corresponding to the target compound. In contrast, although in the peak waveform of FIG. 5, the precision mass range is included in the intensity integration range, the mass-to-charge ratio value Mm which is the peak center is not included in the precision mass range. Thus, this peak may not actually correspond to the target compound intended by the user. That is, in the peak waveform of FIG. 5, the signal intensity value of a compound other than the target compound may be used to create a mass spectrometry image of the target compound.

Although FIGS. 4 and 5 show the respective mass spectrometry images created and displayed for the target compound that are almost the same, there is a great discrepancy in the differences between precise mass-to-charge ratio values of the specified target compound and observed mass-to-charge ratio values. It is inferred that as the difference is larger, the mass spectrometry image is more affected by another compound, i.e., accuracy of the two-dimensional intensity distribution of the target compound is likely to be low. However, there is a problem in that even when an operator views the displayed mass spectrometry image, the above-mentioned mass difference and influence of quality deterioration due to the mass difference cannot be grasped.

CITATION LIST

Patent Literature

Patent Literature 1: WO 2017/183086 A
Patent Literature 2: JP 2017-32465 A

Non Patent Literature

Non Patent Literature 1: "iMScope TRIO Imaging Mass Microscope", [online], [Searched on Mar. 16, 2018], Shimadzu Corporation, Internet

SUMMARY OF INVENTION

Technical Problem

The present invention is made to solve the above problem, and it is an object of the present invention to provide an imaging mass spectrometry data processing device capable of providing useful information for a user to evaluate accuracy and quality of a mass spectrometry image in a precise mass-to-charge ratio value of a target compound specified by the user or a mass-to-charge ratio value specified by the user in terms of mass accuracy.

Solution to Problem

The present invention made to solve the above problem is an imaging mass spectrometry data processing device configured to process mass spectrometry data which is profile data obtained from a plurality of micro areas in a measurement area on a sample, and that includes a) an input reception unit configured to receive a specification by a user of a compound or a mass-to-charge ratio value to be displayed in a mass spectrometry image, b) a mass difference calculation unit configured to calculate a difference, for each micro area, between a mass-to-charge ratio value corresponding to a compound specified by the user or a target mass-to-charge ratio value which is a mass-to-charge ratio value specified by the user, and an observed mass-to-charge ratio value which is acquired from a peak observed in a profile spectrum formed using the profile data and which is inferred to correspond to the target mass-to-charge ratio value, and c) a mass difference image creator configured to create and display an image showing a two-dimensional distribution of mass differences corresponding to the measurement area or a part of the measurement area based on information on the mass difference calculated by the mass difference calculation unit for each micro area.

The "mass spectrometry data" in the present invention includes not only simple mass spectrometry data that does not involve a dissociation operation for ions, but also MS$^n$ spectral data obtained by MS$^n$ analysis in which n is two or more. The data to be processed by the present invention is profile data in a predetermined mass-to-charge ratio range collected for each micro area in the measurement area. Although the type of the mass spectrometer for acquiring the mass spectrometry data is not particularly limited, a time-of-flight mass spectrometer is typically used.

In the present invention, for example, when a user specifies a certain compound as a display target in the mass spectrometry image, the input reception unit receives the specification and obtains a precise mass-to-charge ratio value corresponding to the compound, as the target mass-to-charge ratio value, using an existing compound database, for example. The mass difference calculation unit acquires, for each micro area in the measurement area, an observed mass-to-charge ratio value which is a center position of a peak inferred to correspond to the target mass-to-charge ratio value described above among peaks detected in the profile spectrum formed using the profile data, and calculates a mass difference between the observed mass-to-charge ratio value and the target mass-to-charge ratio value.

The center position of the peak observed in the profile spectrum may be, for example, a position of the center of gravity of a peak obtained by applying centroid conversion processing to a peak having a mountain shape appearing in the profile spectrum. Alternatively, the center position of the peak may be simply the position of the peak top of a peak having a mountain shape, or the position of the peak top of a peak obtained by performing deconvolution processing on a peak having a mountain shape. Whether or not a certain peak in the profile spectrum corresponds to the target mass-to-charge ratio value may be estimated by simply determining whether or not the center position of the peak is closest to the target mass-to-charge ratio value and the difference between the center position and the target mass-to-charge ratio value is within a predetermined value, for example.

When the mass difference is calculated for each micro area, the mass difference image creator creates an image showing a two-dimensional distribution of the mass differences corresponding to the measurement area or a part of the measurement area. That is, for example, numerical values of the mass differences may be associated with a color scale, and magnitudes of the mass differences may be represented by a heat map. Such a mass difference image enables an image having high quality and an image having low quality as a whole to be clear among mass spectrometry images of a plurality of compounds, for example. Additionally, a portion having a large difference between the target mass-to-charge ratio value and the observed mass-to-charge ratio value and a portion having a small difference between them become apparent on the sample.

A preferred aspect of the present invention may further include an index value calculation unit configured to calculate an index value representing an overall tendency of mass differences in a plurality of micro areas included in all or a part of the measurement area based on the mass differences in the plurality of micro areas.

As the index value, one or more of an average value, a mode value, a maximum value, a minimum value, a difference between the maximum value and the minimum value, a variance, and the like, can be used. Displaying such an index value together with the mass difference image enables the user to easily grasp the overall tendency of the mass differences in the target compound or the mass-to-charge ratio value.

Another preferred aspect of the present invention may further include a graph creation unit configured to create a graph showing a tendency of a distribution of mass differences in a plurality of micro areas included in all or a part of the measurement area based on the mass differences in the plurality of micro areas.

The graph is typically a histogram showing a relationship between a range of a mass difference and the frequency (the number of micro areas) for each micro area. Displaying such a graph together with a mass difference image enables the user to easily grasp mass differences that are biased to a specific state (i.e., many micro areas each showing a specific mass difference). This enables an operator to grasp whether another compound having a precise mass-to-charge ratio close to that of the target compound is evenly distributed throughout the measurement area or is unevenly distributed in a specific site.

Advantageous Effects of Invention

According to the present invention, a user can grasp a situation of mass accuracy from a mass difference image and evaluate accuracy and quality of a mass spectrometry image in a target compound or a target mass-to-charge ratio value based on the situation. This enables not only a mass spectrometry image presumed to have poor quality to be excluded from an analysis target, but also a mass spectrometry image having higher quality to be created by manually changing parameters used for creating the mass spectrometry image.

DESCRIPTION OF EMBODIMENTS

Hereinafter, an imaging mass spectrometer including an imaging mass spectrometry data processing device according to an embodiment of the present invention will be described with reference to the accompanying drawings.

Figure 1:
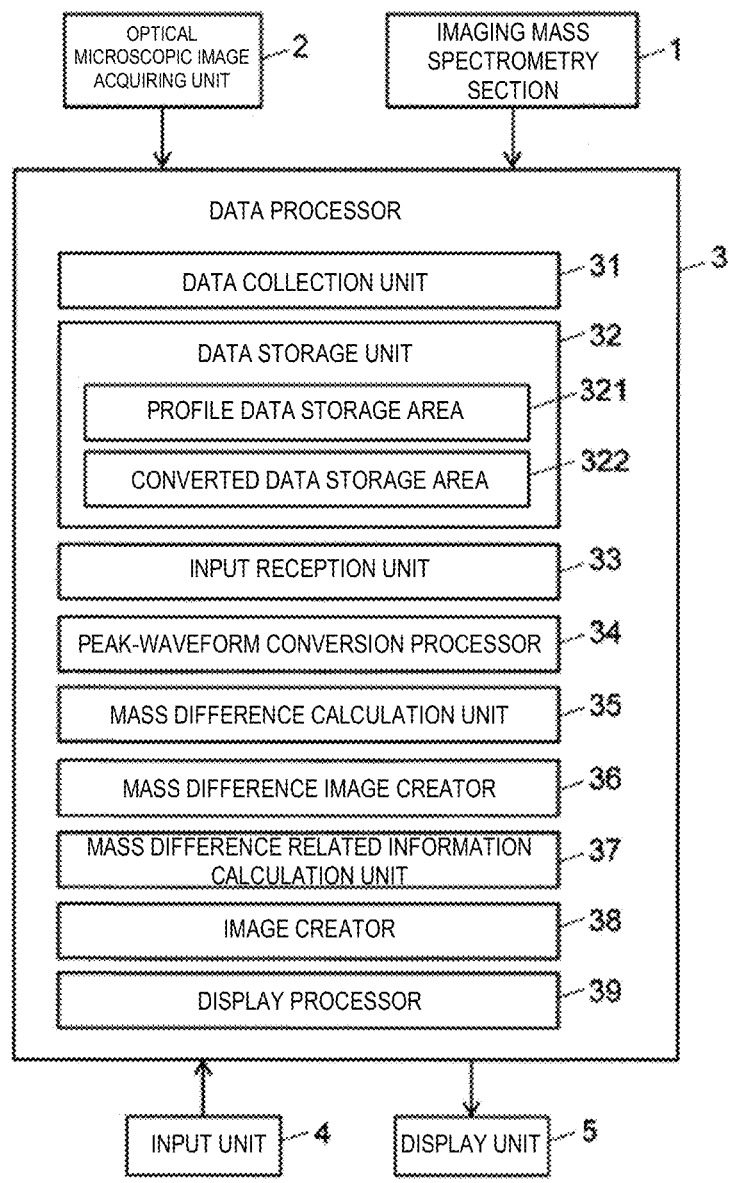
FIG. 1 is a schematic block diagram of an imaging mass spectrometer including a spectrometry data processing device according to an embodiment of the present invention.

FIG. 1 is a schematic configuration diagram of the imaging mass spectrometer according to the present embodiment. FIGS. 2A-2G are explanatory diagrams of characteristic data processing in the imaging mass spectrometer of the present embodiment.

The imaging mass spectrometer of the present embodiment includes an imaging mass spectrometry section 1 that performs measurement on a sample, an optical microscopic image acquiring unit 2 that captures an optical micro image on the sample, a data processor 3, and an input unit 4 and a display unit 5 each serving as a user interface.

Figure 2A:
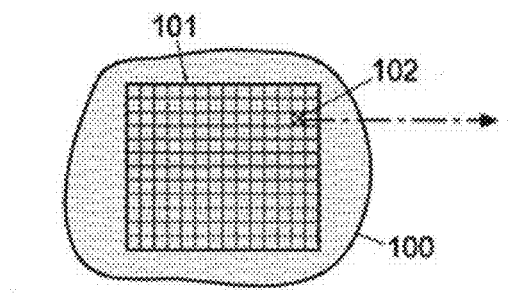
FIGS. 2A-2G are explanatory views of MS image creation processing in an imaging mass spectrometer of the present embodiment.

The imaging mass spectrometry section 1 includes a matrix-assisted laser desorption/ionization (MALDI) ion trap time-of-flight mass spectrometer, for example, and performs mass spectrometry on many measurement points (micro areas) 102 in a two-dimensional measurement area 101 on a sample 100 such as a biological tissue section to acquire mass spectrometry data for each micro area, as shown in FIG. 2A. Here, the mass spectrometry data is mass spectrum data over a predetermined mass-to-charge ratio range, but may be $MS^n$ spectrum data for a specific precursor ion. The optical microscopic image acquiring unit 2 is formed by adding an image acquiring unit to an optical microscope and acquires a microscopic image of a two-dimensional area of the surface on a sample.

The data processor 3 performs predetermined processing after receiving mass spectrum data in each micro area collected by the imaging mass spectrometry section 1, and includes a data collection unit 31, a data storage unit 32, an input reception unit 33, a peak-waveform conversion processor 34, a mass difference calculation unit 35, a mass difference image creator 36, a mass difference related information calculation unit 37, an image creator 38, and a display processor 39, as functional blocks. The data storage unit 32 includes a profile data storage area 321 for storing raw data collected by measurement using the imaging mass spectrometry section 1 and a converted data storage area 322 for storing data processed by the peak waveform conversion processing described later.

In general, the data processor 3 is in fact a personal computer (or a higher-performance workstation), and is configured to execute a function of each of the blocks by operating dedicated software installed in the computer on the computer. In that case, the input unit 4 is a pointing device such as a keyboard or a mouse, and the display unit 5 is a display monitor.

Next, the measurement work for the sample by the imaging mass spectrometer of the present embodiment will be described.

First, when an operator sets the sample 100 to be analyzed at a predetermined measurement position in the optical microscopic image acquiring unit 2 and performs a predetermined operation using the input unit 4, the optical microscopic image acquiring unit 2 captures an image of a surface of the sample 100 and displays the image on a screen of the display unit 5. The operator indicates a measurement area, which is all or a part of the sample 100, on the image using the input unit 4.

The operator temporarily takes out the sample 100 from the device and attaches a matrix for MALDI to the surface of the sample 100. Then, the operator sets the sample 100 with the matrix attached at a predetermined measurement position in the imaging mass spectrometry section 1, and performs a predetermined operation using the input unit 4. This allows the imaging mass spectrometry section 1 to acquire mass spectrometry data over a predetermined mass-to-charge ratio range by performing mass spectrometry on each of the many micro areas in the measurement area indicated as described above on the sample 100. At this time, the data collection unit 31 performs so-called profile acquisition to collect profile data that is a continuous waveform in a mass-to-charge ratio direction within the mass-to-charge ratio range, and then stores the profile data in the profile data storage area 321 of the data storage unit 32. As a matter of course, the profile data storage area 321 stores a column of digitized data of samples acquired by sampling continuous profile waveforms at a predetermined sampling interval (sufficiently smaller than a peak width of each waveform).

When a pattern on a sample surface (borders of different tissues, etc.) can be observed relatively clearly even with the matrix attached to the sample surface, the optical microscopic image acquiring unit 2 may capture an image after the matrix is preliminarily attached to the sample surface.

After measurement of the sample 100 targeted is completed, the operator specifies a compound for which the two-dimensional intensity distribution in the sample 100 is to be determined (hereinafter referred to as a "target compound") from the input unit 4. The input reception unit 33 receives this input information. When the target compound is specified, the input reception unit 33 acquires a precise mass-to-charge ratio value (typically a theoretical value of a mass-to-charge ratio) corresponding to the specified compound with reference to a compound database or the like stored preliminarily.

The target compound can be specified by a method of directly inputting a compound name or selecting a compound from a compound list prepared preliminarily, for example. To specify a plurality of target compounds, although the target compounds may be specified one by one by the above method, a plurality of target compounds may be preliminarily listed to allow a plurality of target compounds listed in the list to be collectively specified by selecting the list. Instead of specifying the target compound, a mass-to-charge ratio value Ma (hereinafter referred to as a "target mass-to-charge ratio value") for which a two-dimensional intensity distribution is to be determined may be directly specified.

The user also specifies an allowable range $\Delta M$ of a mass-to-charge ratio assumed while specifying the target compound or the target mass-to-charge ratio value. However, when specifying a plurality of target compounds or target mass-to-charge ratio values, the operator does not necessarily specify an allowable range for each target compound or target mass-to-charge ratio, and thus the allowable range may be common to all the target compounds or the target mass-to-charge ratios, for example. Additionally, instead of specifying an allowable range using a numerical value of a unit of a mass-to-charge ratio such as "Da" or "u", the allowable range may be specified using a ratio to a mass-to-charge ratio value to be the center, such as "ppm". As a matter of course, other specification methods may be used. What is important is that some allowable range is set for each target compound or each target mass-to-charge ratio. Thus, regardless of whether a target compound or a target mass-to-charge ratio value is specified, information on the mass-to-charge ratio value Ma to be the center and the allowable range $\Delta M$ can be obtained for each target compound or each target mass-to-charge ratio value.

Figure 2B:
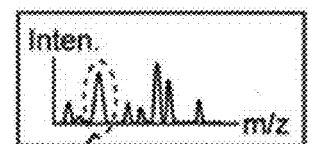
Figure 2C:
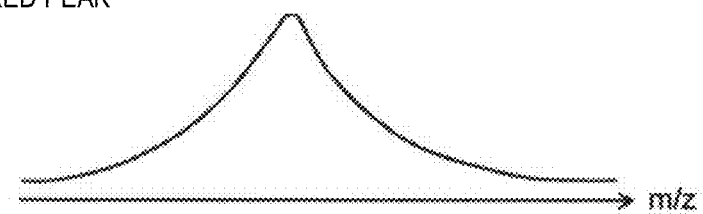
Figure 2D:
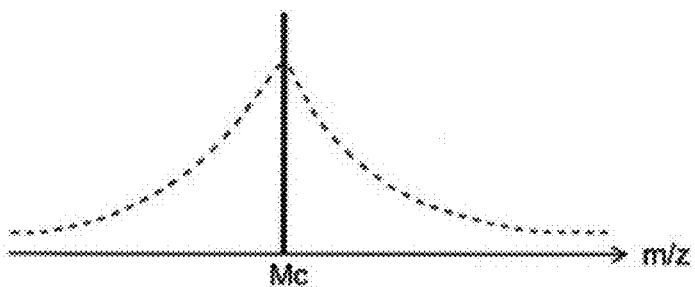

The peak-waveform conversion processor 34 reads out profile data in a predetermined mass-to-charge ratio range near a mass-to-charge ratio value M specified for each micro area from the profile data storage area 321 and forms a profile spectrum (refer to FIGS. 2B and 2C). Then, the peak-waveform conversion processor 34 detects a peak having a mountain shape appearing in the profile spectrum for each micro area, and performs centroid conversion processing on the peak detected. For the centroid conversion processing, for example, a well-known algorithm described in Patent Literature 2 or the like may be used, and the position of the center of gravity and an area value of the peak having a mountain shape are typically calculated. Then, the position of the center of gravity, i.e., a mass-to-charge ratio value, is defined as the position of the rod-like peak, and the area value is defined as the height of the rod-like peak, i.e., the signal intensity value. This allows one peak having a mountain shape to be converted into one rod-like peak (so-called centroid peak), as shown in FIG. 2D.

Instead of detecting a peak in a profile spectrum in a predetermined mass-to-charge ratio range near the mass-to-charge ratio value Ma specified, peaks may be detected in a profile spectrum of the entire mass-to-charge ratio range acquired by measurement, and then the centroid conversion processing may be performed on each of the peaks detected. When data constituting a mass spectrum including the rod-like peak acquired by performing the centroid conversion processing as described above is stored in the converted data storage area 322 of the data storage unit 32, mass spectrometry image creation processing described later can be performed without performing the centroid conversion processing on the same profile spectrum again.

Figure 2E:
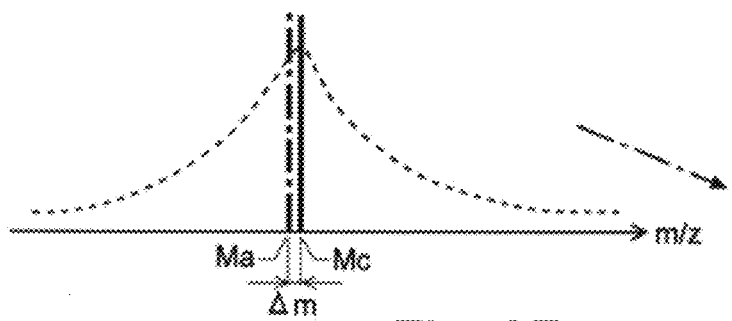
Figure 2G:
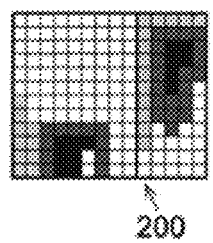
Figure 2F:
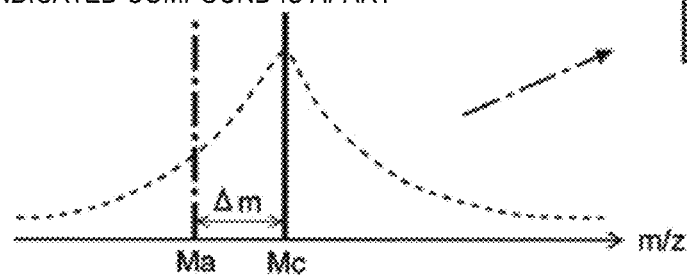

The image creator 38 calculates a mass-to-charge ratio range [Ma−$\Delta M$ to Ma+$\Delta M$] from the mass-to-charge ratio value Ma and the allowable range $\Delta M$ for each target compound or for each target mass-to-charge ratio value in each micro area. Then, the image creator 35 determines whether or not a rod-like peak exists in the mass-to-charge ratio range [Ma−$\Delta M$ to Ma+$\Delta M$], and when the rod-like peak exists in the mass-to-charge ratio range [Ma−$\Delta M$ to Ma+$\Delta M$], the height (signal intensity value) Ic of the rod-like peak is regarded as a signal intensity value corresponding to the target compound in the micro area, as shown in FIG. 2E. In contrast, when the rod-like peak does not exist in the mass-to-charge ratio range [Ma−$\Delta M$ to Ma+$\Delta M$] as shown in FIG. 2F, a signal intensity value corresponding to the target compound in the micro area is set to zero.

Then, the image creator 38 determines a signal intensity value corresponding to each micro area by performing similar processing in each micro area. This allows a signal intensity value of each of the many micro areas 102 included in the measurement area 101 to be acquired for each target compound or each target mass-to-charge ratio value. Then, the signal intensity values are two-dimensionally disposed corresponding to positions of the micro areas 102 and display colors are applied to the respective signal intensity values according to a predetermined color scale to create a mass spectrometry image. The display processor 39 causes the mass spectrometry image created for each of the target compound and the target mass-to-charge ratio value to be displayed on the screen of the display unit 5 in the form of a list, for example.

Then, the mass difference calculation unit 35 calculates a mass difference (absolute value) $\Delta m$ between the mass-to-charge ratio value Ma specified by the operator and a mass-to-charge ratio value Mc based on measurement data for each micro area. The mass difference $\Delta m$ to be obtained at this time is a difference between a precise mass-to-charge ratio value of the target compound specified by the operator and a mass-to-charge ratio value actually observed for the compound. Thus, a mass difference with respect to a mass-to-charge ratio value Mc obtained from a measured peak that is clearly different from the target compound is meaningless. Then, when there is no mass-to-charge ratio value Mc obtained from a measured peak within a predetermined mass-to-charge ratio range centered on the mass-to-charge ratio value Ma, the mass difference $\Delta m$ may be uniformly set to a predetermined value (a maximum value of the mass difference). The predetermined mass-to-charge ratio range at this time may be expressed as [Ma−$\Delta M$ to Ma+$\Delta M$] described above, or may be a range different from this.

The mass difference image creator 36 creates a mass difference image 200 showing a two-dimensional distribution of the mass difference $\Delta m$ by applying a display color according to the color scale to a value of the mass difference $\Delta m$ calculated for each micro area. Instead of the color scale, a grayscale may be used. The mass difference image 200 shows accuracy of the mass-to-charge ratio for the target compound specified by the operator, and is created as many as target compounds or target mass-to-charge ratio values specified by the operator.

The mass difference related information calculation unit 37 acquires a predetermined index value for grasping a tendency of mass differences of the entire one mass difference image based on a value of the mass difference Δm for each of micro areas corresponding to the one mass difference image and creates a graph. Examples available as the index value includes an average value, a mode value, a maximum value, a minimum value, a variance, a standard deviation, and the like, of the mass difference Δm. Examples available as the graph includes a histogram showing a relationship between a mass difference range in which a value of the mass difference Δm is divided for each predetermined width and a discrete value (i.e., a frequency) of micro areas, and a pie chart or a band graph in which a frequency for each mass difference range is represented by an overall composition ratio. The index value and graph described above can be obtained for each mass difference image, i.e., for each target compound and each target mass-to-charge ratio value specified by the operator.

The display processor 39 causes the mass difference image created by the mass difference image creator 36 and the index value and the graph obtained by the mass difference related information calculation unit 37 to be displayed together on the screen of the display unit 5. These may be displayed in association with the mass spectrometry image of the target compound, or may be displayed corresponding to selection instructed by the operator for a mass spectrometry image displayed on the screen. When only a mass difference image is displayed on the screen and the operator instructs detailed information about the displayed mass difference image to be further displayed, the index value or graph corresponding to the mass difference image may be displayed.

Figure 3:
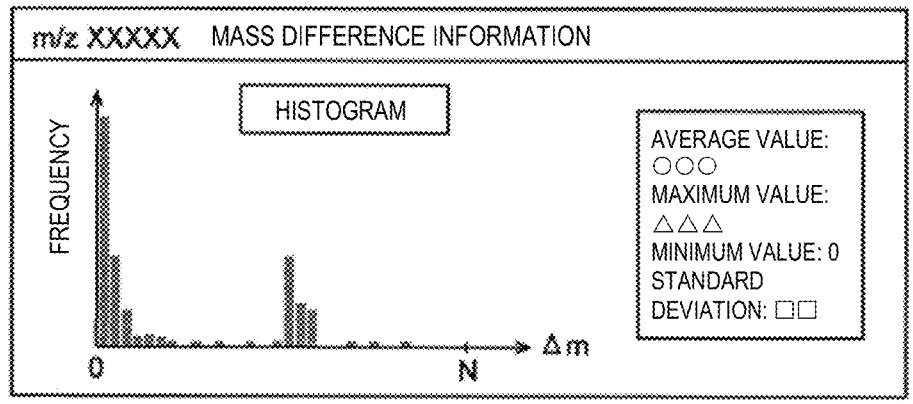
FIG. 3 is a schematic diagram showing an example of mass difference information displayed in an imaging mass spectrometer of the present embodiment.
Figure 4:
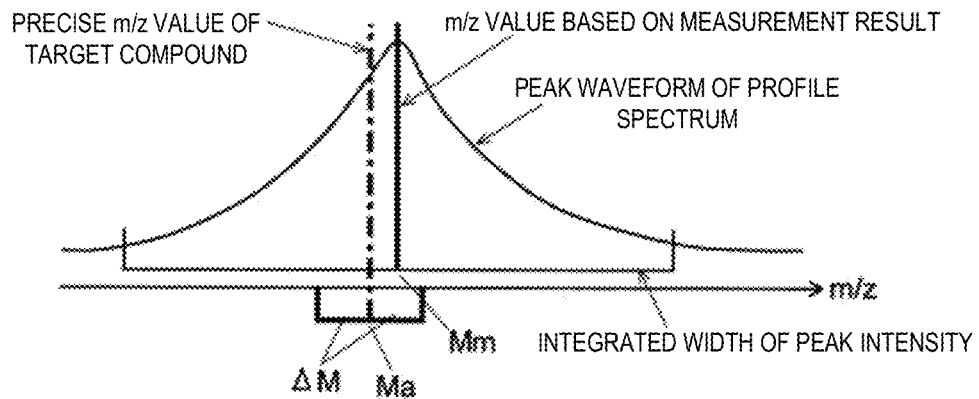
FIG. 4 is a diagram showing an example of a relationship between a precision mass range corresponding to a target compound and an intensity integration range of a peak acquired by measurement.
Figure 5:
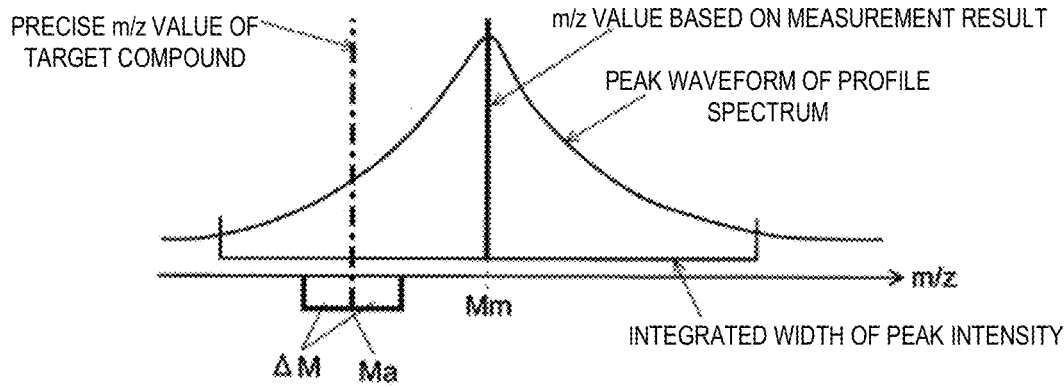
FIG. 5 is a diagram showing another example of a relationship between a precision mass range corresponding to a target compound and an intensity integration range of a peak acquired by measurement.

FIG. 3 shows an example of a screen for displaying a graph and an index value. Here, a histogram of mass differences is displayed. In general, when measurement is performed properly, a mass difference is not so large, and thus a frequency increases in a mass difference range where the mass difference Δm is close to zero. However, the mass difference Δm here increases in frequency at a position away from zero. This suggests that one mass difference image includes a portion having a locally large mass difference, and thus that another compound having a mass-to-charge ratio very close to that of the target compound may locally exists. The operator substantially cannot recognize such a thing from a mass spectrometry image, but can easily recognize it by checking a mass difference image or a graph such as a histogram.

Although the device of the above embodiment allows the peak-waveform conversion processor 34 to perform centroid conversion processing on a peak having a mountain shape to convert the peak into a rod-like peak, a waveform processing method other than the centroid conversion processing may be used as long as a peak having a mountain shape can be converted into a rod-like peak or a narrow peak other than the rod-like peak, having a peak width sufficiently smaller than that of the peak having a mountain shape. Reconstructing data constituting the peak by using deconvolution using a predetermined distribution function such as the Gaussian function enables calculating a peak having a peak width corresponding to about accuracy of the mass spectrometer. As a matter of course, another waveform processing method may be used.

To calculate the mass difference Δm, a mass-to-charge ratio value corresponding to a peak top of a peak having a mountain shape may be used instead of a mass-to-charge ratio value Mc of a peak subjected to the centroid conversion processing.

The embodiment described above is only an example of the present invention. Thus, even when alteration, modification, or addition is appropriately applied to the embodiment within the scope of the spirit of the present invention, the embodiment is clearly included in the scope of claims of the present application.

REFERENCE SIGNS LIST

1 . . . Imaging Mass Spectrometry Unit
2 . . . Optical Microscopic Image Acquiring Unit
3 . . . Data Processing Unit
31 . . . Data Collector
32 . . . Data Storage Section
321 . . . Profile Data Storage Area
322 . . . Converted Data Storage Area
33 . . . Input Reception Unit
34 . . . Peak-waveform Conversion Processor
35 . . . Mass Difference Calculation Unit
36 . . . Mass Difference Image Creator
37 . . . Mass Difference Related Information Calculation Unit
38 . . . Image Creator
39 . . . Display Processor
4 . . . Input Unit
5 . . . Display Unit

The invention claimed is:

1. An imaging mass spectrometry data processing device configured to process mass spectrometry data which is profile data obtained from a plurality of micro areas in a measurement area on a sample, the imaging mass spectrometry data processing device comprising:
  a) an input reception unit configured to receive a specification by a user of a compound or a mass-to-charge ratio value to be displayed in a mass spectrometry image;
  b) a mass difference calculation unit configured to calculate a difference, for each micro area, between a mass-to-charge ratio value corresponding to a compound specified by the user or a target mass-to-charge ratio value which is a mass-to-charge ratio value specified by the user, and an observed mass-to-charge ratio value which is acquired from a peak observed in a profile spectrum formed using the profile data and which is inferred to correspond to the target mass-to-charge ratio value, and
  c) a mass difference image creator configured to create and display an image showing a two-dimensional distribution of mass differences corresponding to the measurement area or a part of the measurement area based on information on the mass difference calculated by the mass difference calculation unit for each micro area.

2. The imaging mass spectrometry data processing device according to claim 1, further comprising:
  an index value calculation unit configured to calculate an index value representing an overall tendency of mass differences in a plurality of micro areas included in all or a part of the measurement area based on the mass differences in the plurality of micro areas.

3. The imaging mass spectrometry data processing device according to claim 1, further comprising:
a graph creation unit configured to create a graph showing a tendency of a distribution of mass differences in a plurality of micro areas included in all or a part of the measurement area based on the mass differences in the plurality of micro areas.

* * * * *